United States Patent [19]

Oelke

[11] 4,161,223
[45] Jul. 17, 1979

[54] PRESSURE RELIEF VALVE FOR ROCK BITS

[75] Inventor: Erwin S. Oelke, Cypress, Calif.

[73] Assignee: Smith International, Inc., Newport Beach, Calif.

[21] Appl. No.: 885,892

[22] Filed: Mar. 13, 1978

[51] Int. Cl.² .............................................. E21B 9/08
[52] U.S. Cl. ................................. 175/228; 175/371; 308/8.2; 137/540
[58] Field of Search ............... 175/227, 228, 371, 372; 308/8.2; 137/540

[56] References Cited

U.S. PATENT DOCUMENTS

| | | | |
|---|---|---|---|
| 3,146,194 | 8/1964 | Hathaway | 137/540 X |
| 3,476,195 | 11/1969 | Galle | 175/228 |
| 3,847,234 | 11/1974 | Schumacher, Jr. et al. | 175/228 |
| 3,854,496 | 12/1974 | Broszeit | 137/540 |
| 3,917,028 | 11/1975 | Garner | 175/228 X |
| 4,061,376 | 12/1977 | Villaloboz | 308/8.2 |

Primary Examiner—Ernest R. Purser
Assistant Examiner—Nick A. Nichols, Jr.
Attorney, Agent, or Firm—Robert M. Vargo

[57] ABSTRACT

A sealed rotary rock bit is disclosed in which a combined manual venting and pressure relief system is located within the lubrication reservoir of the rock bit. The seal rotary rock bit comprises a main bit body having a plurality of legs extending downwardly therefrom. Each leg has a rolling cone cutter rotatively mounted thereon. A lubrication system is provided in each leg to provide lubricant to the bearing area between the cutter and the leg. The lubrication system includes a reservoir of lubricant communicating via passageways with the bearing area. The reservoir further includes a rubber boot molded around a metal stiffener sleeve. A cover cap is attached to the rubber boot. The rubber boot is in the form of a resilient membrane and is exposed through the cover cap to the exterior of the rock bit and through the passageways to the interior of the lubricated bearing area. The vent and pressure relief system comprises an annular seat formed in the wall of the reservoir. A valve face is formed on the rubber boot and is biased against the annular seat by means of a belleville spring acting on the cover cap. If any excessive pressure develops within the lubricant reservoir, the excess is blown off through the valve seat. Any internal pressures can also be manually vented without removing the cover cap by a slight prying action on the cover cap.

6 Claims, 3 Drawing Figures

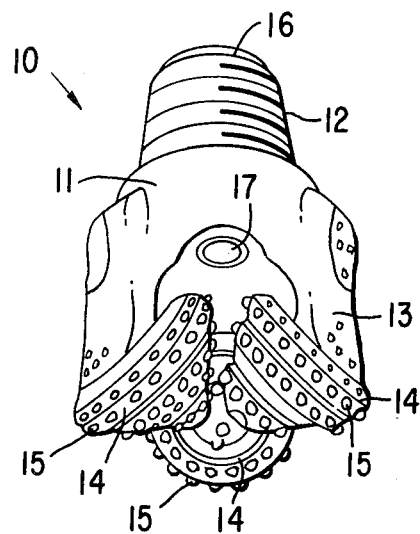
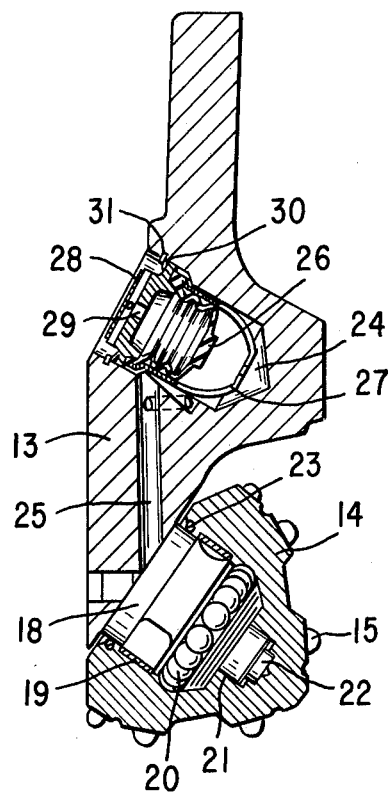
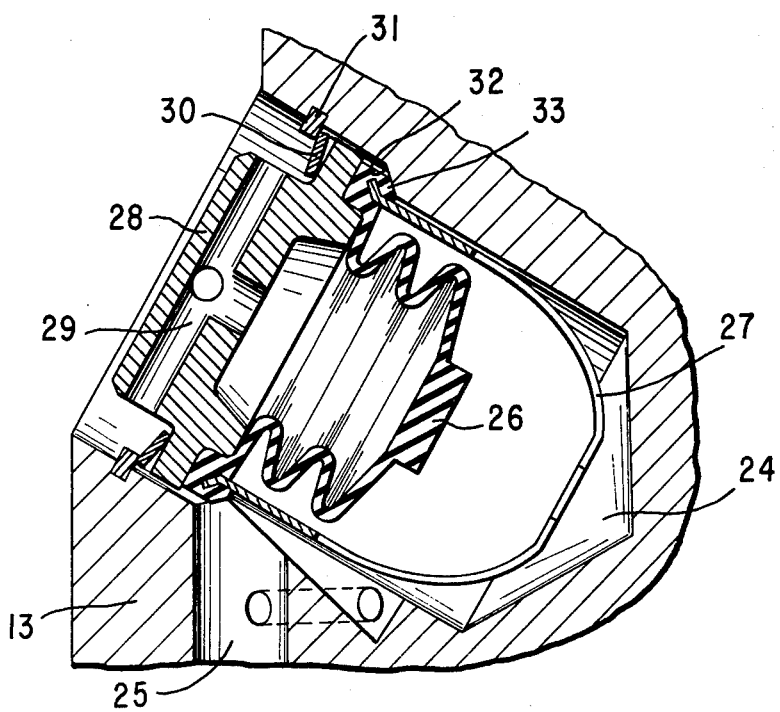

PRESSURE RELIEF VALVE FOR ROCK BITS

BACKGROUND OF THE INVENTION

1. Field of the Invention

The present invention relates generally to sealed rotary rock bits and, more particularly, to the lubrication systems utilized in such bits.

2. Description of the Prior Art

A rotary rock bit generally consists of a main bit body adapted to be connected to a rotary drill string. A conventional bit usually includes two or more legs integrally connected to form a bit body. Each leg includes a cutter rotatively mounted on a journal pin extending from the leg. Bearings are provided between the cutter and the journal pin to promote rotation of the cutter and means are provided on the outer surface of the cutter for disintegrating the formations as the bit and cutter rotate.

In lubricated rock bits, a lubrication system is provided which includes an annular seal located at or near the back-face of the cutter to prevent the lubricant from leaking from the bearing area to the exterior of the rock bit and prevent drilling fluid and debris from entering the bearing area. The lubrication system further includes a reservoir filled with a lubricant, typically a high viscosity petroleum grease, with passages provided to communicate the reservoir with the bearing space between the cutter and the journal pin. A compensator in the form of a resilient membrane is located in the reservoir with one side of the membrane exposed to the lubricant and the other side exposed to the exterior of the rock bit. The compensator functions to equalize the pressure on the mud side of the seal with the pressure on its lubricant side under varying pressure conditions.

A compensator of the type described is found in U.S. Pat. No. 3,476,195. The referenced patent also describes a low pressure relief valve which functions to relieve excessive gas pressures in the bit during normal drilling. However, during the raising and lowering of the drill bit into an existing bore hole, a substantial pressure differential can develop. Providing a low pressure relief system would not operate properly because the relief valve would open prematurely before deleterious pressure differentials are reached. Therefore, too much lubricant would be lost during the drill lowering operations.

Moreover, there are severe limitations as to space in conventional rock bits and the amount of space taken up by the relief valve in the referenced patent is considered by many as being too much for the safe operation of the rock bit.

SUMMARY OF THE INVENTION

The present invention obviates the above-mentioned problems by providing a lubrication system which incorporates a high pressure relief valve that is operable in cases where excessive gas pressures develop.

In its boradest aspect, the present invention pertains to a sealed bearing rock bit having a lubrication system which includes a reservoir and a pressure compensator located therein. A high pressure relief arrangement is incorporated in the reservoir. The arrangement includes the rubber boot utilized as the compensator having an annular valve face which is biased against a seat formed in the reservoir wall.

An advantage of the present invention is that the valve arrangement is under a large spring bias. Therefore, the relief system will not open during normal operating cycles of the drill. Only when pressure differentials in excess of 150 PSI are encountered will the relief system be functional.

Another advantage of the present invention is that the relief arrangement is located within existing structure of the rock bit thereby eliminating the need for additional structure and bores to house the structure.

The spring bias acting on the rubber boot comprises a belleville spring being urged against the cover cap of the boot. The spring is retained within the reservoir by means of a snap ring.

An advantage of this novel structure is that any internal pressure can be vented manually without removing the cap. A slight prying action on the cover cap will relieve all pressures.

As a result a further advantage of the present invention combines a manual venting capability with an automatic pressure relief capability without requiring any substantial additional space.

The features of the present invention, which are believed to be novel, are set forth with particularity in the appended claims. The present invention, both as to its organization and manner of operation, together with the further advantages thereof, may best be understood by reference to the following description taken in connection with the accompanying drawings.

BRIEF DESCRIPTION OF THE DRAWINGS

FIG. 1 is a perspective view of a seal rotary rock bit;

FIG. 2 is a sectional view of one leg of the rotary rock bit; and

FIG. 3 is an enlarged fragmentary view of the lubricant reservoir incorporating the pressure relief system of the present invention.

DESCRIPTION OF THE PREFERRED EMBODIMENT

Referring now to the drawings, FIG. 1 illustrates a three cone rotary rock bit, although, the invention can be utilized in other types of rock bits. The rotary rock bit, generally indicated by arrow 10, comprises a bit body 11 having an upper threaded portion 12 for connection to the lower end of a rotary drill string (not shown). Extending downwardly from the bit body 11 are three substantially identical legs 13. The lower end of each of the legs is provided with an extended journal pin, details of which will be discussed hereinafter.

A rotary cone cutter 14 is rotatively positioned on each journal pin of a respective leg 13. Each cone cutter 14 includes a cutting structure 15 on its outer face which is adapted to disintegrate the formations as the bit is rotated and moved downward. The cutting structure 15 is shown in the form of tungsten carbide inserts, however, it is to be understood that other cutting structures such as milled steel teeth formed on the cone cutters may be utilized.

The bit 10 further includes a central passageway 16 extending along the center axis of body 11 to allow drilling fluid to enter from the upper section of the drill string immediately above and pass downward through three jet nozzles 17, one of which is shown in FIG. 1.

In operation, the drill bit 10 is connected as a lower member of a rotary drill string (not shown) and lowered into a well bore until the rotatable cone cutter 14 engages the bottom of the well bore. Upon engagement with the bottom well bore the drill string is rotated, rotating bit 10 therewith. Drilling fluid is forced down through the interior passage of the rotary drill string and continues through the central passageway 16 of the bit 10, passing through the three nozzles 17, past the cutting structure 15 of the cutter 14 to the bottom of the well bore, and then upwardly into the annulus between the rotary drill string and the wall of the well bore carrying with it the cuttings and debris from the drilling operations.

FIG. 2 illustrates the interior structure of one leg 13 of the rock bit 10. The leg 13 includes a journal pin 18 extending inwardly for engaging the bearing surfaces of the cutter 14. Although several combinations of bearing assemblies can be utilized, the system illustrated comprises a friction bearing 19, ball bearings 20, a friction bearing 21, and a thrust button 22. An annular seal 23 is located at the backface of the cutter 14 to prevent lubricant from leaking from the bearing area to the exterior of the rock bit.

The lubrication system for each leg 13 comprises a reservoir 24 filled with a lubricant communicating with the bearing area via a passageway 25. Other passageways (not shown) are located within the journal pin 18 connecting passageway 25 with the various bearing assemblies 19, 20, 21 and 22. A compensator, commonly referred to as a rubber boot, is located in the reservoir 24. The compensator comprises a resilient membrane 26 molded around a stiffener sleeve 27. A cover cap 28 is attached to the upper end of the membrane 26 and includes passageways 29 for exposing the one side of the membrane 26 to the exterior pressures acting on the rock bit 10. The other side of the membrane 26 is exposed to the lubricant pressures. In order for the seal 23 to function properly, the lubricant pressure acting on the seal 23 must be equal to the exterior or mud pressure acting on the seal 23. This is accomplished by the pressure compensator described above. As the mud pressure increases, the increased mud pressure acts on the membrane 26 to compress the lubricant within the lubricant system until the lubricant pressure and mud pressure equalize.

Conventionally, the cover cap 28 is secured within the reservoir 24 by a threaded connection. However, this is not followed in the present construction. In the present embodiment the cover cap 28, along with the membrane 26 and sleeve 27 is floatingly mounted within the reservoir 24 by means of a belleville spring 30 which, in turn, is secured by means of a snap ring 31 engageable with the wall of the reservoir 24. The belleville spring 30 provides the spring bias for the pressure relief system of the present invention.

The pressure relief system further includes a valve seat 32 in the form of an annular shoulder formed on the wall of the reservoir 24. The valve seat 32 functions to receive a valve face 33 formed on the membrane 26. The valve face 33 is biasedly urged against the seat 32 by the belleville spring 30. The valving arrangement described above functions to relieve the excess lubricant pressure generated. This is accomplished when the lubricant pressure overcomes the spring force of the belleville spring 30 to unseat the valve face 33 from the seat 32. In the preferred embodiment, the spring pressure on the belleville spring 30 is equal to 150 pounds per square inch.

Beside functioning to relieve excessive lubricant pressures during operation, the internal pressures can be manually vented without removing the cap 28. This is easily accomplished with a slight prying action on the cap 28 to again overcome the bias of the belleville spring 30 to unseat the valve face 33.

It should be noted that various modifications can be made to the assembly while still remaining within the purview of the following claims.

What is claimed is:

1. A sealed lubricated rotary rock bit comprising;
 a bit body having at least one leg extending downwardly therefrom, said leg having a journal pin for rotatively supporting a rolling cutter, a seal between said rolling cutter and said journal pin;
 a lubricant reservoir disposed in said bit body communicating with the bearing area between said rolling cutter and said journal pin, said reservoir further having a pressure compensator disposed therein, said pressure compensator comprising a resilient membrane separating the reservoir into a lubricant region and a drilling fluid region; and
 means for relieving excess lubricant pressure around said membrane to the exterior of said bit body, said pressure relief means comprising an annular seat formed in the wall of said reservoir, a valve face formed on the outer circumference of said membrane, and means for biasing said valve face against said valve seat to prevent flow of lubricant from within said reservoir to the exterior thereof until the excess lubricant pressure exceeds a pre-selected value.

2. The combination of claim 1 wherein said pressure compensator further includes a stiffener sleeve attached to said membrane.

3. The combination of claim 1 wherein said pressure compensator further includes a cover cap attached to said membrane, said cover cap having passages formed therein for communicating the exterior of the bit body with the one side of the membrane.

4. The combination of claim 3 wherein said biasing means comprises a belleville spring acting on said cover cap.

5. The combination of claim 4 wherein said belleville spring is secured within said reservoir.

6. The combination of claim 5 wherein said belleville spring is secured adjacent the wall of said reservoir by a snap ring.

* * * * *